(12) United States Patent
Sepulveda et al.

(10) Patent No.: US 10,371,113 B2
(45) Date of Patent: Aug. 6, 2019

(54) METHOD FOR OPERATING A POWER GENERATING DEVICE AND POWER GENERATING DEVICE

(71) Applicant: EKU Power Drives GmbH, Stuttgart (DE)

(72) Inventors: Leonardo Uriona Sepulveda, Stuttgart (DE); Martin Ball, Leonberg (DE)

(73) Assignee: EKU Power Drives GmbH, Stuttgart (DE)

(*) Notice: Subject to any disclaimer, the term of this patent is extended or adjusted under 35 U.S.C. 154(b) by 60 days.

(21) Appl. No.: 15/517,733

(22) PCT Filed: Oct. 6, 2015

(86) PCT No.: PCT/EP2015/072970
§ 371 (c)(1),
(2) Date: Apr. 7, 2017

(87) PCT Pub. No.: WO2016/055428
PCT Pub. Date: Apr. 14, 2016

(65) Prior Publication Data
US 2017/0306861 A1    Oct. 26, 2017

(30) Foreign Application Priority Data
Oct. 7, 2014 (DE) .......... 10 2014 220 311

(51) Int. Cl.
*F02N 11/08* (2006.01)
*F02D 41/04* (2006.01)
(Continued)

(52) U.S. Cl.
CPC .......... *F02N 11/0848* (2013.01); *F02D 29/06* (2013.01); *F02D 41/0027* (2013.01);
(Continued)

(58) Field of Classification Search
CPC ............ F02N 11/0848; F02N 11/0825; F02N 11/0862; F02N 11/0818; F02N 2200/046;
(Continued)

(56) References Cited

U.S. PATENT DOCUMENTS

| 6,724,098 | B2 | 4/2004 | Ortega et al. |
| 2009/0107441 | A1* | 4/2009 | Husak ...................... 123/179.16 |

(Continued)

FOREIGN PATENT DOCUMENTS

| DE | 8908775 U1 | 9/1989 |
| DE | 4422636 | 1/1996 |

(Continued)

OTHER PUBLICATIONS

International Serarch Report and Written Opinion Form PCT/ISA/220, International Application No. PCT/EP2015/072970, pp. 1-4, International Filing Date Oct. 6, 2015, search report dated Nov. 12, 2015.

*Primary Examiner* — Jacob M Amick
*Assistant Examiner* — Charles Brauch
(74) *Attorney, Agent, or Firm* — Bond Schoeneck & King, PLLC; George McGuire

(57) ABSTRACT

The invention relates to a method for operating a power generating device (2) comprising an internal combustion engine, in particular a gas motor or a gas turbine, and an energy accumulator. Said internal combustion engine and the energy accumulator are electrically coupled together. Said internal combustion engine (16) can be operated in accordance with a first estimated value and in accordance with a second estimated value.

10 Claims, 5 Drawing Sheets

(51) Int. Cl.
*F02D 29/06* (2006.01)
*F02D 41/00* (2006.01)

(52) U.S. Cl.
CPC ........ *F02D 41/042* (2013.01); *F02N 11/0818* (2013.01); *F02N 11/0825* (2013.01); *F02N 11/0862* (2013.01); *F02D 2200/1004* (2013.01); *F02N 2200/046* (2013.01); *F02N 2200/061* (2013.01); *Y02T 10/48* (2013.01)

(58) Field of Classification Search
CPC .. F02N 2200/061; F02D 29/06; F02D 41/042; F02D 41/0027; F02D 2200/1004; Y02T 10/48
See application file for complete search history.

(56) References Cited

U.S. PATENT DOCUMENTS

2012/0030270 A1* 2/2012 Shokrollahi ................. 708/802
2012/0056436 A1* 3/2012 Russell ...................... 290/40 B

FOREIGN PATENT DOCUMENTS

| DE | 102004044960 | | 5/2005 |
|----|--------------|----|--------|
| DE | 102005027229 | | 1/2006 |
| DE | 102006037649 | | 2/2008 |
| DE | 102010013626 | A1 | 10/2011 |
| DE | 102010034444 | | 2/2012 |

* cited by examiner

METHOD FOR OPERATING A POWER GENERATING DEVICE AND POWER GENERATING DEVICE

CROSS-REFERENCE TO RELATED APPLICATIONS

This application is the U.S. National Stage filing under 35 U.S.C. 371 of international application number PCT/EP2015/072970 filed on Oct. 6, 2015, which in turn claims priority to German Application No. 102014220311.2, filed Oct. 7, 2014, the entire disclosure of each of which is incorporated herein by reference.

BACKGROUND OF THE INVENTION

The invention relates to a method for operating a power generating device according to the preamble of claim 1 and to a power generating device according to an independent claim.

It is known that lean-burn gas motors having output powers in the range of above 400 kW have a slow-acting load alteration response in comparison with diesel motors in this power range. However, gas motors have a better emission behaviour in comparison with diesel motors. Furthermore, gas motors can be operated using waste gases or unrefined gases that result during the extraction of natural gas and/or petroleum.

It is also known that these lean-burn gas motors can be operated in a low partial-load range only for short periods of time. Furthermore, manufacturer instructions regarding the start-up and turn-off behaviour of the lean-burn gas motor have to be respected.

DE 10 2006 037 649 A1 discloses, for example, a gas motor having improved non-steady behaviour. Upstream of a turbine of an exhaust gas turbocharger, an additional fuel injection valve is arranged in the exhaust gas line.

U.S. Pat. No. 6,724,098 B2 discloses a generator system having a gas turbine, a generator driven by the gas turbine, and an energy accumulator, in which system the generator is operated as a motor in order to accelerate the gas turbine.

SUMMARY OF THE INVENTION

The object of the invention is therefore to provide a method for operating a power generating device and a power generating device, in order to improve operation of the power generating device by means of an combustion engine that has a slow-acting load alteration response.

The object addressed by the invention is achieved by a method according to claim 1 and by a power generating device according to an independent claim. The dependent claims relate to advantageous developments. Features that are important to the invention are also stated in the following description and in the drawings, it being possible for the features to be important to the invention both in isolation and in different combinations without this being explicitly indicated again.

A turn-off start time point for the combustion engine is determined on the basis of an actual power of the combustion engine and on the basis of a state of charge of the energy accumulator. A turn-off process of the internal combustion engine is started at the turn-off start time point. Advantageously, this makes it possible for lean-burn gas motors that have a low-transient performance to also be usable for high-transient applications. Thus, a lean-burn gas motor can advantageously be operated using unrefined gas and, at the same time, by means of the method, high amounts of power can be provided for short periods of time in order to operate, for example, oil drilling rigs or the like.

In particular, it is ensured that, as a result of a power sink suddenly being removed, all of the energy generated during a turn-off process of the combustion engine can be absorbed by the energy accumulator. In particular, when using gas motors, a slow shutdown in the form of an overrun can ensure that maintenance intervals and outages of the gas motor can be reduced.

Furthermore, this method ensures that the accumulator has a high state of charge most of the time, which has a positive influence on the service life thereof when using, for example, a lithium ion battery. The increased charge of the accumulator which is thus possible results in an increased availability of the power generating device.

Advantageously, a power generating device that has a slow-acting energy source, such as a gas motor, and has an increased service life, together with reduced exhaust gas emissions and high-transient power output, can thus be provided. Advantageously, the efficiency of the entire system is improved since no braking apparatus, such as a braking resistor, is required to consume surplus energy generated by the gas motor.

In an advantageous embodiment, a first estimated value for energy that is generated during an overrun of the combustion engine is determined on the basis of the actual power. A second estimated value for energy that the energy accumulator can reliably absorb during the overrun is determined on the basis of the state of charge. The turn-off process is started if the first estimated value is greater than the second estimated value. Advantageously, the energy accumulator is thus operated in an acceptable range. Furthermore, the combustion engine advantageously does not have to be provided with a braking apparatus in order to consume surplus energy generated by the combustion engine. Of course, a braking apparatus can also continue to be provided for an emergency shutdown or the like.

In an advantageous embodiment, the turn-off process is started if the actual power of the combustion engine is greater than a maximum charging capacity of the energy accumulator. This prevents destruction of the power generating device, in particular in the converter region. In an advantageous embodiment, the actual power of the combustion engine is reduced as a function of an increasing state of charge of the energy accumulator. The actual turn-off start time for the turn-off process of the combustion engine can advantageously be further delayed thereby, as a result of which the operating time of the combustion engine can advantageously be increased In an advantageous development, the turn-off process is started if the actual power of the combustion engine is lower than a minimum continuous power of the combustion engine. This means that the combustion engine can advantageously be operated in the range of the minimum continuous power or above the minimum continuous power until the turn-off time point has been reached. Advantageously, the turn-off time point is therefore moved further into the future.

In an advantageous embodiment, a start-up enabling time point for the combustion engine is determined on the basis of the state of charge of the energy accumulator, on the basis of a performance during a run-up of the combustion engine, and on the basis of a performance during an overrun of the combustion engine. A start-up process of the combustion engine is enabled at the start-up enabling time point. Advantageously, this ensures that, when the combustion engine has been turned off, the combustion engine is only started up again if it has been ensured that energy generated by starting the combustion engine can be reliably absorbed by the energy accumulator during a run-up and an overrun.

Further features, possibilities for application and advantages of the invention can be found in the following description of embodiments of the invention, which are shown in the figures of the drawing. All the features that are described or shown, taken in isolation or in any desired combination, form the subject matter of the invention, independently of the manner in which they are worded or shown in the description or in the drawings, respectively. For functionally equivalent variables and features, the same reference signs are used in all the figures, even in different embodiments. Embodiments of the invention given by way of example are explained in the following, with reference to the drawing, in which:

DETAILED DESCRIPTION

Figure 1:
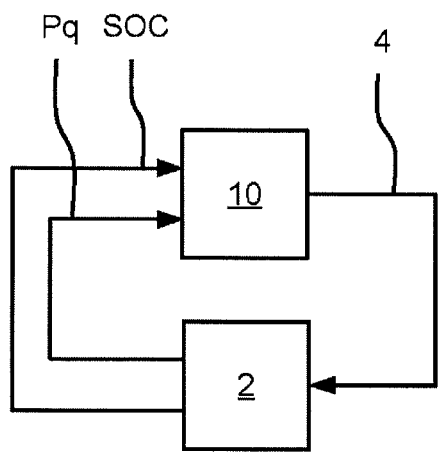
FIG. 1 is a schematic block diagram

FIG. 1 is a schematic block diagram for the operation of a power generating device 2 comprising an combustion engine and an energy accumulator. A turn-off start time 4 for the combustion engine is determined by the block 10 on the basis of an actual power Pq of the combustion engine and on the basis of a state of charge SOC. The block 10 is, for example, part of a controller for the power generating device. A turn-off process of the combustion engine is started at the turn-off start time 4.

Figure 2:
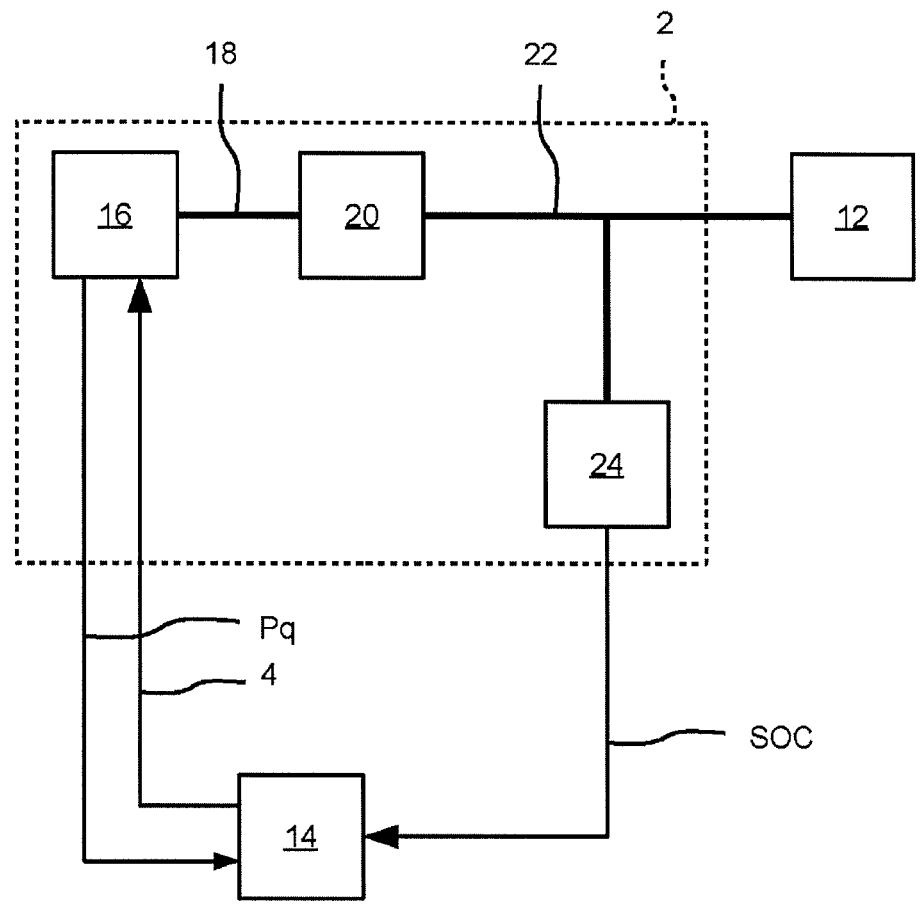
FIG. 2 is a schematic view of a power generating device, a load, and a controller.

FIG. 2 is a schematic view of the power generating device 2 and a load 12, which can also be referred to as an energy sink and is electrically coupled to the power generating device 2. A controller 14 for operating the power generating device 2 is also shown. The variables 4, Pq and SOC are supplied to the controller 14. Furthermore, other variables (not shown) can, of course, also be supplied to the controller 14. Of course, equivalent variables can also be used instead of the variables 4, Pq and SOC, or alternatively the variables 4, Pq and SOC are inherent to the correspondingly used variables. The power generating device 2 comprises an combustion engine 16 that is designed in particular as a gas motor or gas turbine. The combustion engine 16 is mechanically coupled to a generator 20 according to the mechanical connection 18, the generator 20 supplying electrical energy to an electrical connection 22 which can be designed, in particular, as a direct-current network. The electrical connection 22 interconnects the generator 20, the load 12, and an energy accumulator 24 within the meaning of an electrical coupling. The electrical connection 22 comprises cable connections, converters and similar devices in order to allow energy to be exchanged between the units 20, 12 and 24. The variables Pq and SOC relate to the electrical level according to the connection 22. Of course, the device 2 can comprise a plurality of drives, even of different kinds, which supply energy to the connection 22. Accordingly, a plurality of loads 12 can also be connected to the power generating device 2. A plurality of energy accumulators, even of different kinds, are also conceivable.

Figure 3:
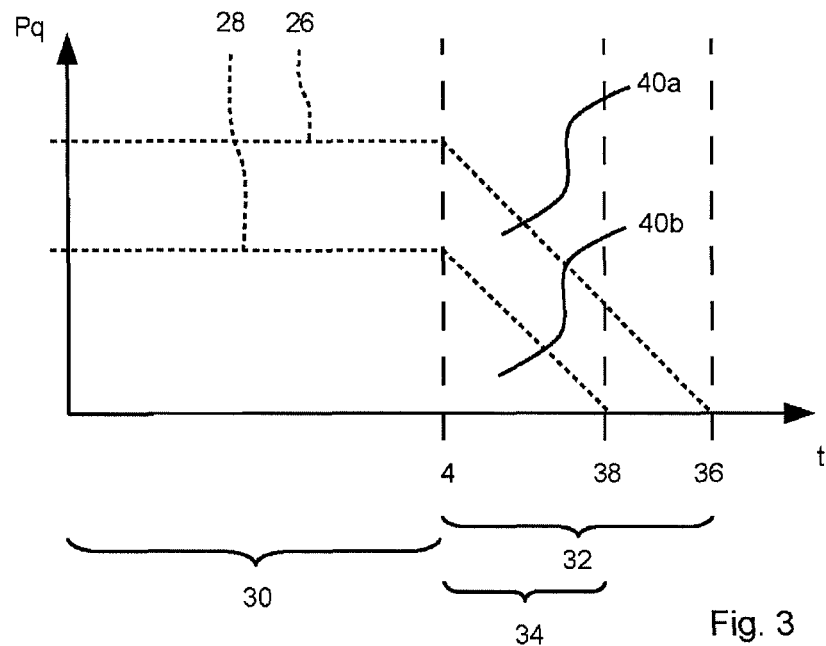
FIGS. 3 and 4 are each power/time diagrams

FIG. 3 is a schematic power/time diagram. By way of example, two curves 26 and 28 of the actual power Pq of the combustion engine 16 are shown. The curve 26 has a higher value of actual power Pq than the curve 28 during normal operation 30. From the turn-off start time 4, a turn-off process 32 or 34 is started that ends at a time point 36 for the curve 26 and ends at a time point 38 for the curve 28. At the time points 36 and 38, the combustion engine 16 is substantially turned off and no longer outputs any power.

In particular, a gas motor should not be turned off immediately, and a step-like curve of the actual power Pq arises, which is shown, in the present case, in an idealised manner in the regions of the turn-off process 32 and 34. At the turn-off time point 4, on the basis of the actual power Pq turn-off processes 32 and 34 of different lengths arise that result in different amounts of generated energy. Shortly before or at the time point 4, on the basis of the actual power Pq of the combustion engine 16 a corresponding estimated value 40 for the energy that is still anticipated is formed, which value can, in the present case, be determined for example as an integral below the curves 26 or 28 in the region of the turn-off processes 32 or 34, respectively. The turn-off processes 32 and 34 can each also be referred to as an overrun.

Figure 4:
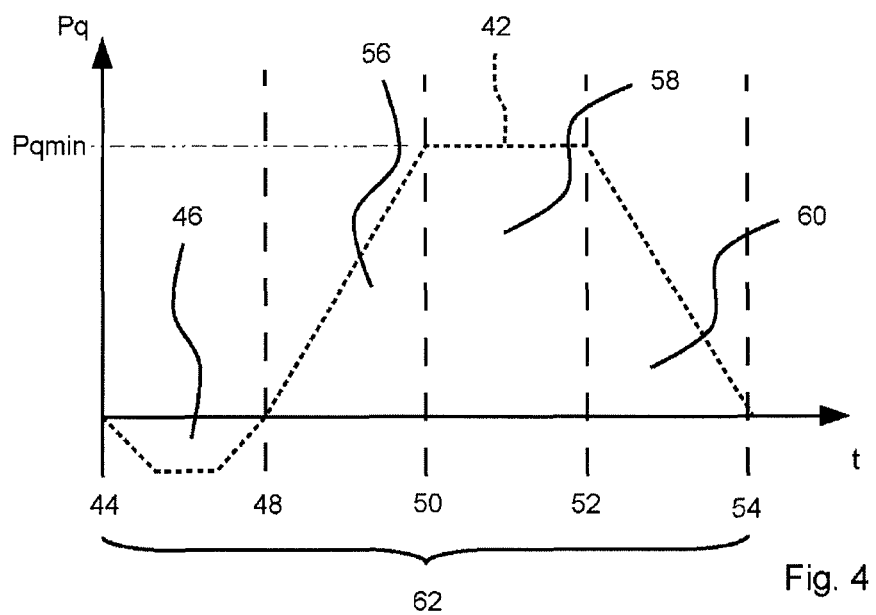

FIG. 4 is schematic view of a power/time diagram. A curve 42 of the actual power Pq of the combustion engine 16 over time is shown. At a start-up enabling time point 44, the generator 20 receives energy from the energy accumulator 24 in order to start the combustion engine 16, as a result of which a negative curve 42 arises. An estimated value 46 for the reception of energy from the energy accumulator 24 is found from a negative integral.

From a time point 48, the combustion engine 16 outputs energy to the connection 22 and increases the energy output up to a minimum continuous power Pqmin at a time point 50.

From the time point 50, the curve 42 remains at the level of the minimum continuous power Pqmin up to a time point 52, in order to fall to a value of zero from the time point 52 up to the time point 54.

For a run-up of the combustion engine 16 from the time point 48 up to the time point 50, an estimated value 56 for the energy outputted by the combustion engine 16 in the time period between the time points 48 and 50 is determined. An estimated value 58 is also determined that ascertains the energy output by the combustion engine 16 between the time points 50 and 52. A further estimated value 60 is determined in the same way as the estimated value 40.

The composition of the curve 42 depends on the configuration and requirements of the combustion engine 16. For example, the curve 42 may also be composed only of the parts between the time point 48 and the time point 50 and between the time point 52 and the time point 54. Pqmin may also be dispensed with. The portions of the curve 42 between the time points 44 and 48 and the between the time points 50 and 52 are therefore optional and are intended to be provided depending on the configuration of the power generating device 2. In particular, the time point 48 may also be selected as the start-up enabling time point. Therefore, all estimated values between the time points 44 and 54 are totalled to an estimated value 62 that describes a minimum energy output of the combustion engine 16 during a start-up or turn-off of the combustion engine 16.

The start-up enabling time point 44 enables the starting or start-up for other functions that determine the starting of the combustion engine 16. This means that a start-up of the combustion engine 16 is allowed temporally after the start-up enabling time point 44, but need not necessarily occur. Temporally prior to the start-up enabling time point 44, a start-up of the combustion engine 16 is prevented.

Figure 5:
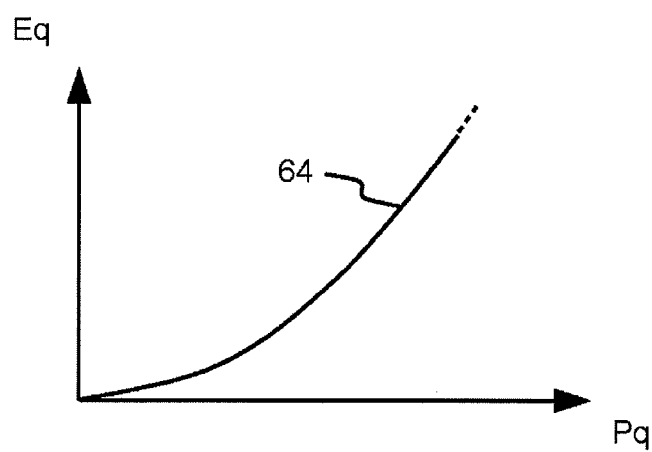
FIG. 5 is a schematic energy/power diagram.

FIG. 5 is schematic view of an energy/power diagram having a curve 64. The diagram or the curve 64 can be stored in the controller 14 as a characteristic map, in order to determine, on the basis of an actual power Pq of the combustion engine 16, overrun energy Eq that would still be generated by the combustion engine 16 during an overrun or during a turn-off process and that the energy accumulator must be able to reliably absorb. The curve 64 arises, by way of example, if it is assumed that there is a substantially triangular area under the curves 26 and 28 according to FIG. 3 in the regions 32 and 34.

In the same way, an energy/power diagram and a corresponding characteristic that is similar to the curve 64 can be determined for the estimated value 62 from FIG. 4.

Figure 6:
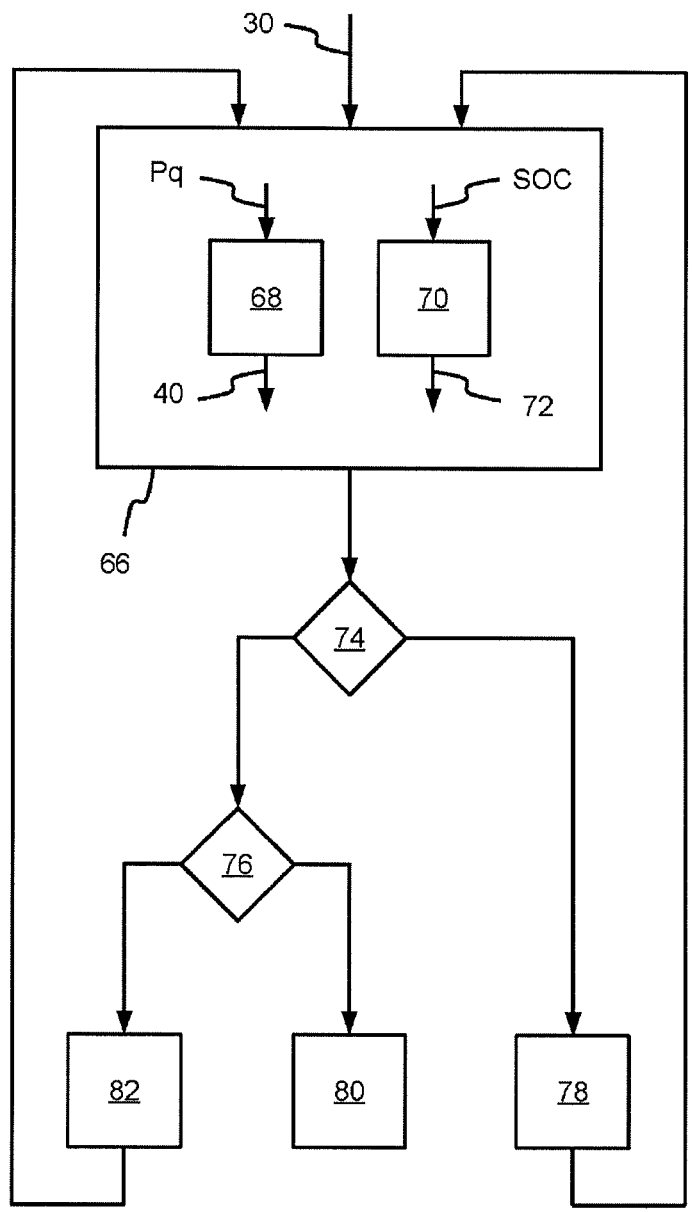
FIGS. 6 and 7 are each schematic flow diagrams.

FIG. 6 is a schematic flow diagram. During normal operation 30 of the power generating device 2, a block 66 is carried out. Two blocks 68 and 70 are arranged in the block 66. The block 68 determines, from the actual power Pq, the estimated value 40 for energy Eq that is generated by the combustion engine 16 during an overrun 32, 34. The estimated value 40 is also referred to as the first estimated value. The block 70 determines, on the basis of the state of charge SOC, a second estimated value 72 for energy that the energy accumulator 24 can reliably absorb during the overrun 32, 34. The energy received by the load 12 is indirectly observed by means of the second estimated value 72 being determined.

The second estimated value 72 can, of course, be linked to a fixed value; for example, the fixed value can be added to the second estimated value 72 in order to carry out an adjustment to the particular type of energy accumulator 24 and to thus improve operation of the energy accumulator 24 by means of a desired target state of charge. Specifying a fixed value in such a manner may be necessary for deliberately discharging the energy accumulator 24, in particular when taking the power generating device 2 out of operation in a planned manner.

At a branching point 74, the first estimated value 40 and the second estimated value 72 are compared with one another. If the first estimated 40 is greater than the second estimated value 72, a transition is made to the branching point 76. If the first estimated value 40 is no greater than the second estimated value 72, a transition is made to the block 78. The block 78 enables a further increase in the actual power Pq.

In order to protect the energy accumulator 24, the aforesaid condition for transitioning to the branching point 76 can be AND-linked to the following condition: the actual power Pq of the combustion engine 16 is greater than a maximum charging capacity of the energy accumulator 24. Of course, a direct transition to a state 80 can also be made.

Starting from the branching point 76, a transition is made to a block 80, and the turn-off process 32, 34 is started if the actual power Pq of the combustion engine 16 is lower than the minimum continuous power Pqmin of the combustion engine 16. This prevents the combustion engine 16 from remaining in an operative state that is beyond the specification of the combustion engine 16. Of course, a transition can also be made from the branching point 74 directly to the state 80, the turn-off process 32, 34 being started if the first estimated value 40 is greater than the second estimated value 72.

If, at the branching point 76, the actual power Pq of the combustion engine 16 is greater than the minimum continuous power Pqmin, the actual power Pq of the combustion engine 16 is reduced in a block 82, in particular as a function of an increasing state of charge SOC of the energy accumulator 24.

Figure 7:
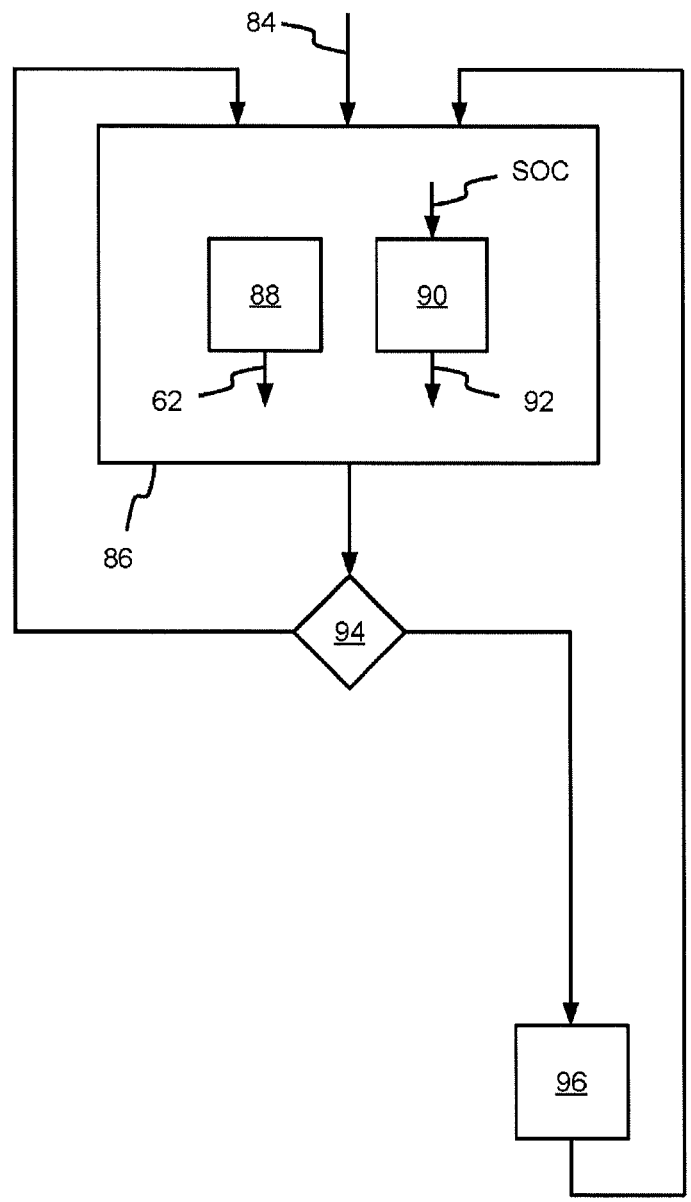

FIG. 7 is a schematic flow diagram. A transition is made from a state 84, in which the combustion engine 16 is turned off, to a block 86.

In a block 88, the estimated value 62 from FIG. 4 is generated. Of course, the estimated value 62 can also be stored as a fixed value. A block 90 determines, on the basis of the state of charge SOC of the energy accumulator 24, an estimated value 92 for the energy that the accumulator 24 can still reliably absorb at the present point in time.

At a branching point 94, the estimated values 62 and 92 are compared with one another. If the estimated value 62 is no greater than the second estimated value 92, a transition is made to the block 96, in which a start-up process of the combustion engine is then enabled at the start-up enabling time point 44 or 48. This ensures that a specification of the gas motor with regard to its performance when being started up and turned off can be readily adhered to, since the generated energy can be absorbed by the energy accumulator 24. Of course, the start-up time point can also occur later if this allows for a more advantageous operation of the power generating device 2.

The invention claimed is:

1. Method for operating a power generating device comprising a combustion engine and an energy accumulator which are electrically coupled to one another, comprising the steps of determining a turn-off start time point for the combustion engine on the basis of an actual power (Pq) of the combustion engine and on the basis of a state of charge (SOC) of the energy accumulator, and starting a turn-off process of the internal combustion engine at the turn-off start time point.

2. Method according to claim 1, further comprising the steps of determining first estimated value for energy (Eq) generated by the combustion engine during a turn-off process on the basis of the actual power (Pq), determining a second estimated value for energy that the energy accumulator can reliably absorb on the basis of the state of charge (SOC), and starting the turn-off process if the first estimated value is greater than the second estimated value.

3. Method according to either claim 1, further comprising the step of starting the turn-off process if the actual power (Pq) of the combustion engine is greater than a maximum charging capacity of the energy accumulator.

4. Method according to claim 1, comprising the further step of reducing the actual power (Pq) of the combustion engine on the basis of an increasing state of charge (SOC) of the energy accumulator.

5. Method according to claim 4, further comprising the step of starting the turn-off process if the actual power (Pq) of the combustion engine is lower than a minimum continuous power (Pqmin) of the combustion engine.

6. Method according to claim 1, further comprising the step of determining a start-up clearance time for the combustion engine on the basis of the state of charge (SOC) of the energy accumulator, on the basis of a power performance during a run-up of the combustion engine, and on the basis of a power performance during an overrun of the combustion engine, and clearing a start-up process of the combustion engine at the start-up clearance time.

7. A computer program product for a digital arithmetic unit for use in operating a power generating device comprising an combustion engine and an energy accumulator which are electrically coupled to one another, the computer program product comprising a computer readable storage medium having program instructions embodied therewith, wherein the computer readable storage medium is not a transitory signal, the program instructions are readable by a computer to cause the computer to perform a method comprising: determining a turn-off start time point for the combustion engine on the basis of an actual power (Pq) of the combustion engine and on the basis of a state of charge (SOC) of the energy accumulator, and starting a turn-off process of the internal combustion engine at the turn-off start time point.

8. Control unit for operating a power generating device comprising an combustion engine and an energy accumulator which unit is provided with a digital arithmetic unit, in particular a microprocessor, on which a computer program can run, the computer program comprising a computer readable storage medium having program instructions embodied therewith, wherein the computer readable storage medium is not a transitory signal, the program instructions are readable by a computer to cause the computer to perform a method comprising: determining a turn-off start time point for the combustion engine on the basis of an actual power (Pq) of the combustion engine and on the basis of a state of charge (SOC) of the energy accumulator, and starting a turn-off process of the internal combustion engine at the turn-off start time point.

9. Power generating device comprising an combustion engine, in particular a gas motor or a gas turbine, and an energy accumulator, which are electrically coupled to one another, the power generating device adapted to determine a turn-off start time point for the combustion engine on the basis of an actual power (Pq) of the combustion engine and on the basis of a state of charge (SOC) of the energy accumulator, and starting a turn-off process of the combustion engine at the turn-off start time point.

10. Power generating device according to claim 9, wherein the power generating device comprises a computer program product comprising a computer readable storage medium having program instructions embodied therewith, wherein the computer readable storage medium is not a transitory signal, the program instructions are readable by a computer to cause the computer to perform a method comprising: determining a turn-off start time point for the combustion engine on the basis of an actual power (Pq) of the combustion engine and on the basis of a state of charge (SOC) of the energy accumulator, and starting a turn-off process of the internal combustion engine at the turn-off start time point.

* * * * *